United States Patent
Tseng

(10) Patent No.: US 8,160,044 B2
(45) Date of Patent: Apr. 17, 2012

(54) METHOD OF IMPROVING CONTINUOUS PACKET CONNECTIVITY IN A WIRELESS COMMUNICATIONS SYSTEM AND RELATED APPARATUS

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1063 days.

(21) Appl. No.: 12/000,987

(22) Filed: Dec. 19, 2007

(65) Prior Publication Data

US 2008/0144593 A1 Jun. 19, 2008

Related U.S. Application Data

(60) Provisional application No. 60/875,525, filed on Dec. 19, 2006, provisional application No. 60/877,164, filed on Dec. 27, 2006.

(51) Int. Cl.
H04B 7/216 (2006.01)
H04W 4/00 (2009.01)
(52) U.S. Cl. ............... 370/342; 370/329; 370/341
(58) Field of Classification Search ............ 370/342
See application file for complete search history.

(56) References Cited

U.S. PATENT DOCUMENTS

| | | | |
|---|---|---|---|
| 6,631,125 B1 | 10/2003 | Longoni | |
| 2001/0053140 A1 | 12/2001 | Choi | |
| 2003/0103491 A1 | 6/2003 | Frederiksen | |
| 2003/0147371 A1 | 8/2003 | Choi et al. | |
| 2005/0201474 A1* | 9/2005 | Cho et al. | 375/260 |
| 2006/0133402 A1* | 6/2006 | Dottling et al. | 370/431 |
| 2006/0203856 A1 | 9/2006 | Laroia | |
| 2006/0268764 A1 | 11/2006 | Harris | |
| 2006/0291403 A1* | 12/2006 | Kahtava et al. | 370/252 |
| 2007/0195809 A1* | 8/2007 | Blanz et al. | 370/426 |
| 2008/0056229 A1* | 3/2008 | Gholmieh et al. | 370/349 |
| 2009/0168662 A1* | 7/2009 | Tsuboi et al. | 370/252 |

(Continued)

FOREIGN PATENT DOCUMENTS

CN 1679364 A 10/2005
(Continued)

OTHER PUBLICATIONS

Qualcomm Europe, Nokia, Ericsson, Philips, Introduction of DTX-DRX and HS-SCCH less in RCC, Nov. 2006, 3GPP TSG-RAN WG2 Meeting #56, Riga, Lativa, Nov. 6-10, 2006.*

(Continued)

*Primary Examiner* — Jeffrey Pwu
*Assistant Examiner* — Gerald Smarth
(74) *Attorney, Agent, or Firm* — Klein, O'Neill & Singh, LLP

(57) ABSTRACT

In order to enhancing system efficiency of radio resource control, the present invention provides a method for a user equipment in a wireless communications system for improving functions of continuous packet connectivity. The method includes configuring a first HS-PDSCH code of a user equipment according to a variable "HS-PDSCH Code Index" of an information element "HS-SCCH Less Information" before the user equipment activates an HS-SCCH less operation, and configuring a second HS-PDSCH code of the user equipment according to a Boolean variable of the information element "HS-SCCH Less Information", wherein the Boolean variable is indicated by one bit and the second HS-PDSCH code is an adjacent channel code of the first HS-PDSCH code.

8 Claims, 3 Drawing Sheets

U.S. PATENT DOCUMENTS

2009/0207788 A1* 8/2009 Abeta et al. .................. 370/329

FOREIGN PATENT DOCUMENTS

| KR | 1020080049643 | | 6/2008 |
|---|---|---|---|
| TW | 200623737 | A | 7/2006 |
| TW | 200625863 | A | 7/2006 |
| TW | 200633442 | A | 9/2006 |
| WO | 2005002269 | A1 | 1/2005 |
| WO | 2006016212 | A1 | 2/2006 |
| WO | 2006085800 | A1 | 8/2006 |
| WO | 2006130741 | A1 | 12/2006 |

OTHER PUBLICATIONS

Qualcomm Europe et al., "Introduction of DTX-DRX and HS-SCCH less in RRC", 3GPP TSG-RAN WG2 Meeting #56, Tdoc R2-063309, P4, P6, P37-P39, 3rd Generation Partnership Project, Nov. 10, 2006, URL: http://www.3gpp.org/ftp/tsg_ran/WG2_RL2/TSGR2_56/Documents/R2-063309.zip.

Qualcomm Europe, "TP for HS-SCCH-less operation for Continuous Packet Connectivity", 3GPP TSG-RAN WG1 #44bis, R1-060946, P1-P2, 3rd Generation Partnership Project, Mar. 31, 2006, URL: http://www.3gpp.org/ftp/tsg_ran/WG1_RL1/TSGR1_44bis/Docs/R1-060946.zip.

Qualcomm Europe: "TP on Reduced Complexity HS-SCCH-less Operation", 3GPP TSG-RAN WG1 #46, R1-062421, Aug. 28-Sep 1, 2006, pages1-10, XP002594620, Tallinn, Estonia.

3GPP TSG-RAN WG2 Meeting #56 R2-063567, "Introduction of DTX-DRX and HS-SCCH less in RRC," pp. 1-113.

3GPP TR 25.903 V1.2.0. Technical Specification Group Radio Access Network; Continuous Connectivity for Packet Data Users. p. 127, Line 5-40.

Office Action on corresponding foreign application (TW 96148631) from TIPO dated May 16, 2011.

Office Action on corresponding foreign application (TW 96148633) from TIPO dated Jul. 14, 2011.

* cited by examiner

METHOD OF IMPROVING CONTINUOUS PACKET CONNECTIVITY IN A WIRELESS COMMUNICATIONS SYSTEM AND RELATED APPARATUS

CROSS REFERENCE TO RELATED APPLICATIONS

This application claims the benefit of U.S. Provisional Application No. 60/875,525, filed on Dec. 19, 2006 and entitled "Method and Apparatus for Improving Continuous Packet Connectivity (CPC)" and the benefit of U.S. Provisional Application No. 60/877,164, filed on Dec. 27, 2006 and entitled "Method and Apparatus for improving downlink DRX", the contents of which are incorporated herein by reference.

BACKGROUND OF THE INVENTION

1. Field of the Invention

The present invention relates to a method and related apparatus for a user equipment improving continuous packet connectivity (CPC) in a wireless communications system, and more particularly, to a method and related apparatus for a user equipment improving configurations of an HS-SCCH less operation of CPC in a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast and instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate. For HSDPA and HSUPA, the 3rd Generation Partnership Project (3GPP) provides a Continuous Packet Connectivity (CPC) protocol specification, which includes features that, for user equipments (UEs) in CELL_DCH state, aim to significantly increase the number of packet data users for a cell, reduce the uplink noise rise and improve the achievable download capacity for VoIP.

For an HSDPA UE, physical channels include a high speed physical downlink shared channel (HS-PDSCH), for transferring payload data, and a high speed physical control channel (HS-DPCCH) for uploading an acknowledgement/negative acknowledgement (ACK/NACK) and a channel quality identifier (CQI). As for the media access control (MAC) layer of the HSDPA UE, a MAC-hs entity utilizes High Speed Downlink Shared Channel (HS-DSCH) for receiving data from the physical layer. In addition, Shared Control Channel for HS-DSCH (HS-SCCH) is a physical downlink channel, responsible for transmission of control signals corresponding to HS-DSCH, such as demodulation information.

CPC includes an HS-SCCH less operation, which is a special mode of HSDPA operation for reducing HS-SCCH overhead of a hybrid automatic repeat request (HARQ) process, thereby reducing UE power consumption. Under this mode, a first HS-DSCH transmission of the HARQ process corresponding to a transport block (TB) on pre-defined HS-DSCH is performed without accompaniment of HS-SCCH signaling. In this case, the UE needs to perform blind decoding for obtaining TB data of the first transmission based on predefined TB size and channel coding set. If the TB data is decoded successfully, the UE reports a positive acknowledgement (ACK) to the base station, also known as Node-B, through the HS-SCCH; otherwise, the UE does not report any signal and waits for retransmission initiated by the Node-B. Note that, in the HS-SCCH less operation, HARQ retransmissions corresponding to the first HS-DSCH transmission are restricted to two times. Moreover, when performing the HARQ retransmission, the network will transmit required control signals such as "UE identity", "physical channel coding set", "TB size", "pointer", etc. through the HS-SCCH, and the UE can then report ACK or NACK for the retransmission for properly terminating the HARQ process.

As to radio resource control (RRC), the UE and the network, such as the Node-B or a radio network controller (RNC), can configure CPC by exchanging RRC messages and information elements (IEs) that include corresponding parameters. According to the RRC protocol specification of 3GPP, an IE "Continuous Packet Connectivity HS-SCCH Less Information" is provided by the network to inform the UE of required configuration and parameters before enabling the HS-SCCH less operation, among which a variable "HS-PDSCH Code Index" is utilized for configuring a first HS-PDSCH code of the UE, a variable "Transport Block Size List" is utilized for informing the UE of an TB size list including indexes of TB sizes possibly transmitted by the network, an variable "Transport Block Size Index" is utilized for indicating the TB sizes corresponding to each TB size index in the variable "Transport Block Size List" and a variable "HS-PDSCH Second Code Support" is utilized for indicating whether a second HS-PDSCH code is needed to support TB reception for each TB size listed in the variable "Transport Block Size List". If any TB sizes in the variable "Transport Block Size List" need support of the second HS-PDSCH code, which is configured by the network, a variable "HS-PDSCH Second Code Index" is further included for configuring the second HS-PDSCH code of the UE.

That means, for each TB size listed in the variable "Transport Block Size List", the UE can determine whether the second HS-PDSCH code is used for supporting TB reception according to the variable "HS-PDSCH Second Code Support", so that TB data can be obtained from the HS-PDSCH by simultaneously using the first and second HS-PDSCH code.

As well-known by those skilled in the art, the HS-PDSCH has 16 channel codes (or called spreading factors). Thus, the prior art has to use 4 bits (i.e. the variable "HS-PDSCH Code Index") for indicating which code in an Orthogonal Variable Spreading Factor (OVSF) code tree is the first HS-PDSCH code, and use the other 4 bits (i.e. the variable "HS-PDSCH Second Code Index) for indicating the second HS-PDSCH code. In this case, except the 4 bits for indicating the first HS-PDSCH code, if the second HS-PDSCH code is needed for supporting TB reception at this time, the network has to transmit the other 4 bits for configuring the second HS-PDSCH code, resulting in the waste of system radio resources.

SUMMARY OF THE INVENTION

The present invention provides a method and related communications device for a user equipment improving configurations of an HS-SCCH less operation of CPC in a wireless communications system.

The present invention discloses a method of enhancing continuous packet connectivity for a user equipment in a wireless communications system. The method includes configuring a first HS-PDSCH code of the user equipment according to a variable "HS-PDSCH Code Index" of an information element "HS-SCCH Less Information" before the user equipment activates an HS-SCCH less operation, and configuring a second HS-PDSCH code of the user equipment according to an Boolean variable of the information element "HS-SCCH Less Information", among which the Boolean variable is indicated by one bit.

The present invention further discloses a communications device for enhancing continuous packet connectivity in a wireless communications system. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes configuring a first HS-PDSCH code of the communications device according to a variable "HS-PDSCH Code Index" of an information element "HS-SCCH Less Information" before the communications device activates an HS-SCCH less operation, and configuring a second HS-PDSCH code of the communications device according to an Boolean variable of the information element "HS-SCCH Less Information", among which the Boolean variable is indicated by one bit.

The present invention further discloses a method for a user equipment in a wireless communications system improving decoding resource indication. The method includes configuring a first resource block for receiving data from a data channel before the user equipment activates an operation mode, and configuring a second resource block according to an Boolean variable for simultaneously utilizing the first resource block and the second resource block to receive data from the data channel, among which the Boolean variable is indicated by one bit and the second resource block is an adjacent resource block of the first resource block, wherein the user equipment is capable of directly receiving data from the data channel without monitoring a control channel when performing the operation mode.

The present invention further discloses a communications device for improving decoding resource indication in a wireless communications system. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes configuring a first resource block for receiving data from a data channel before the communications device activates an operation mode, and configuring a second resource block according to an Boolean variable for simultaneously utilizing the first resource block and the second resource block to receive data from the data channel, among which the Boolean variable is indicated by one bit and the second resource block is an adjacent resource block of the first resource block, wherein the communications device is capable of directly receiving data from the data channel without monitoring a control channel when performing the operation mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
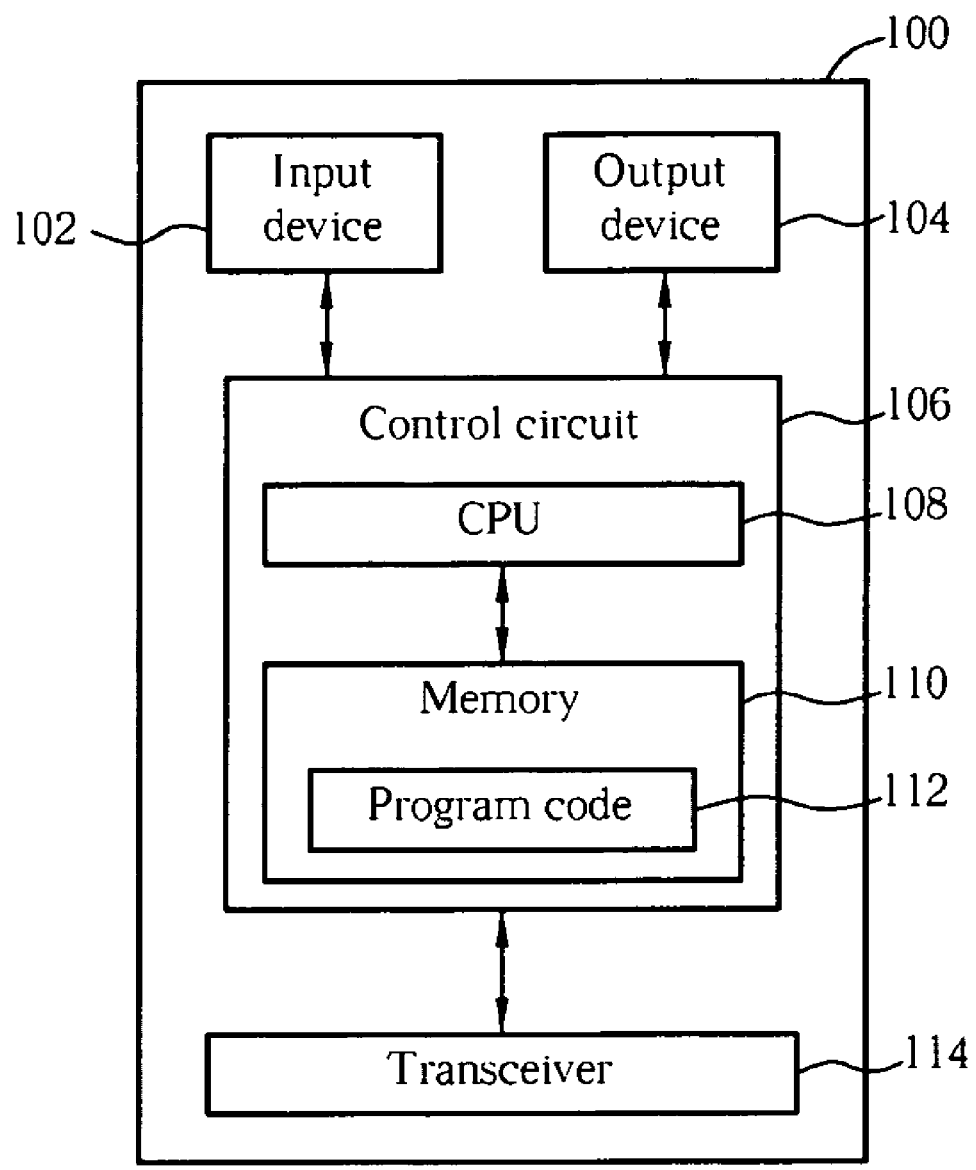
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting Continuous Packet Connectivity (CPC).

Figure 2:
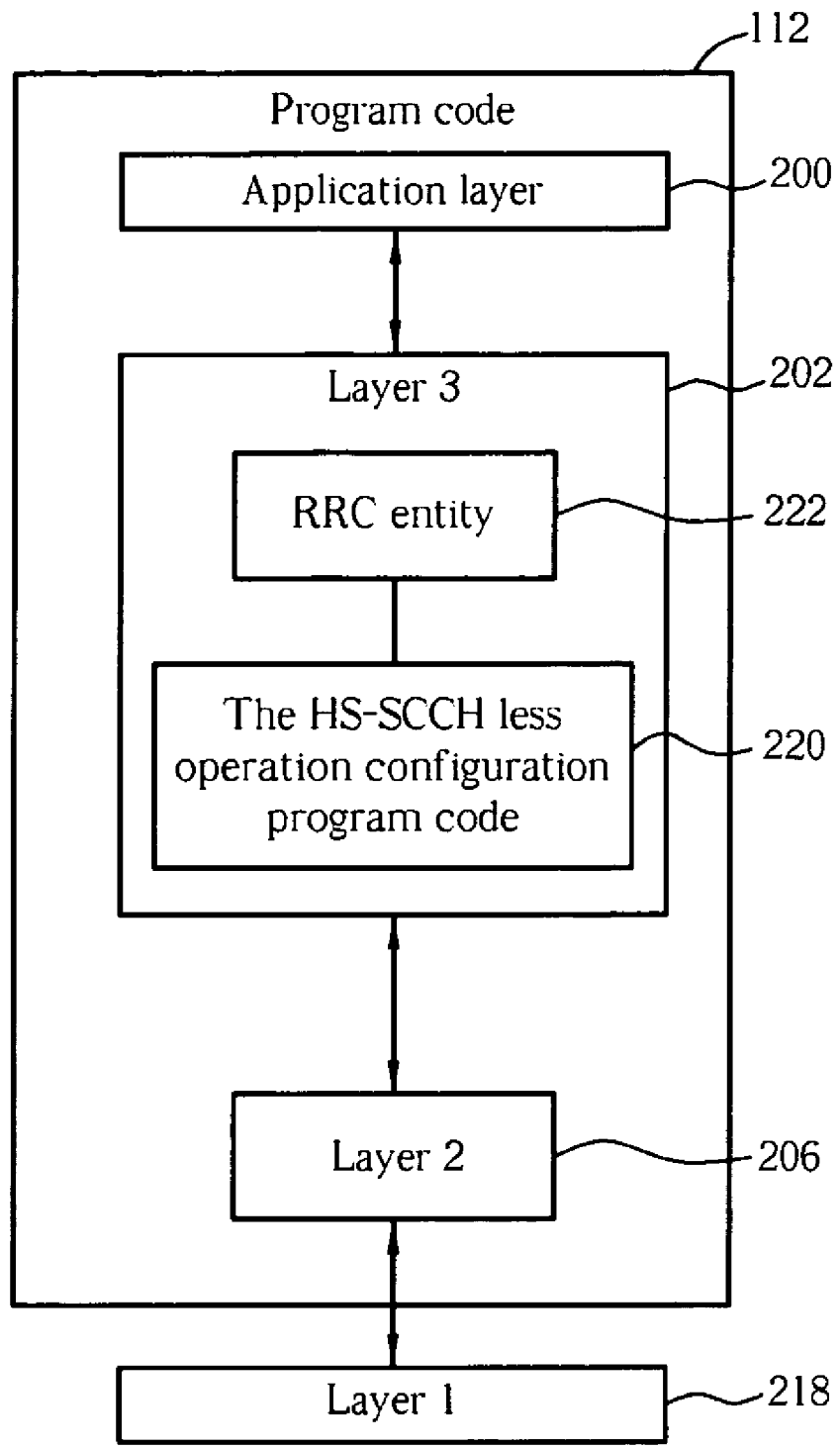
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices, such as a Node-B or a UTAN. In addition, the RRC entity 222 can change an RRC state of the communications device 100, switching between an Idle mode, CELL_PCH, URA_PCH, CELL_FACH or CELL_DCH state.

The Layer 2 206 includes a radio control link (RLC) layer and a media access control (MAC) layer, and the Layer 1 218 is physical layer. When the HSDPA is in use, the MAC layer listens to HS-SCCH for HS-DSCH signaling reception and thereby receives packet data by listening to HS-DSCH. Besides, for the physical layer, HS-PDSCH and HS-DPCCH are used for exchanging payload data between the communications device 100 and the network.

Figure 3:
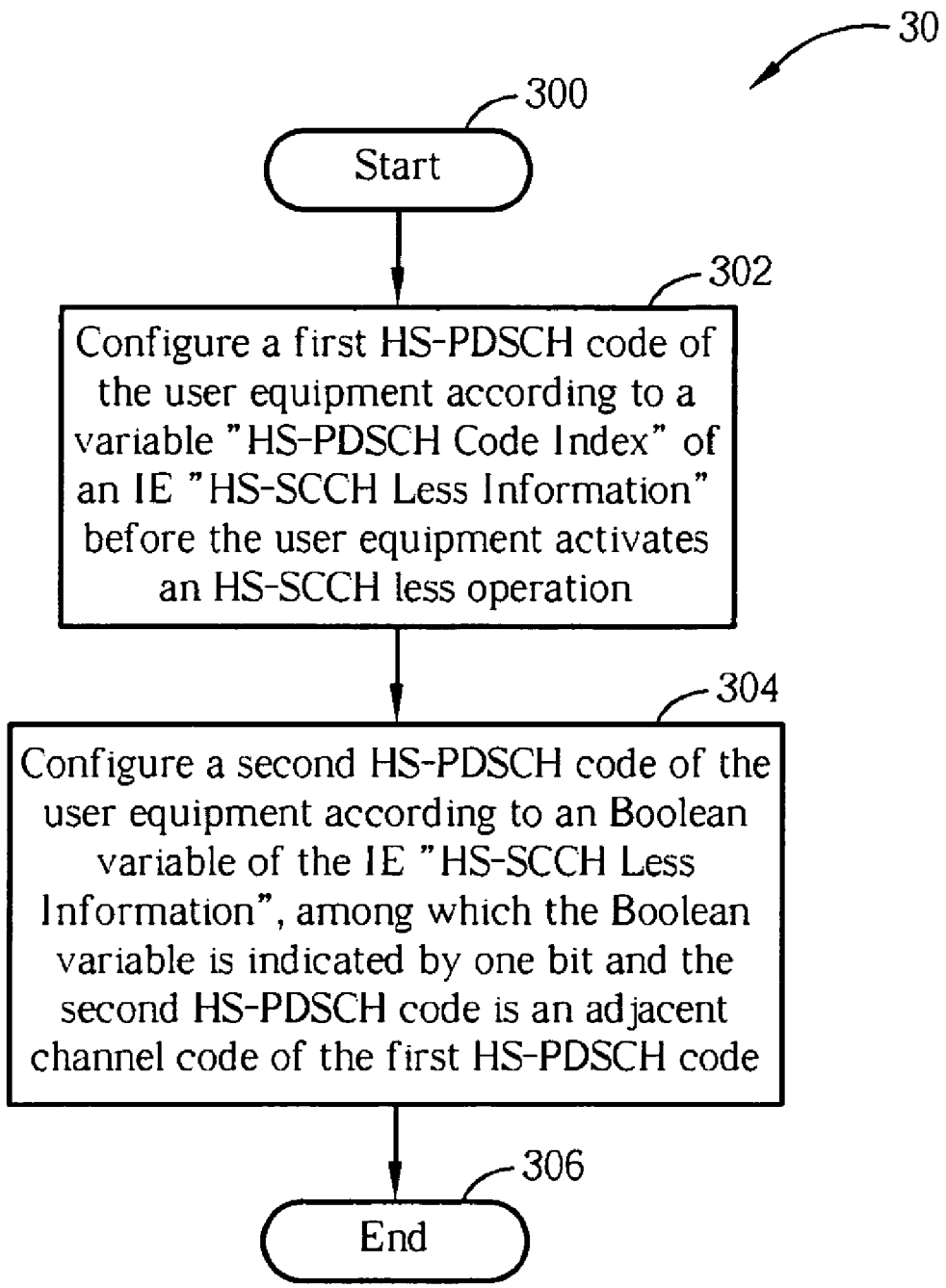
FIG. 3 is a flowchart diagram of a process according to an embodiment of the present invention.

The network communications device can form RRC messages and information elements (IEs) to transmit CPC configuration to the communications device 100 via radio bearers, among which an IE "HS-SCCH Less Information" is provided by the network communications device to inform the communications device 100 of required configurations and parameters before enabling an HS-SCCH less operation in the CPC. In this case, the embodiment of the present invention provides an HS-SCCH less operation configuration program code 220 in the program code 112 for configuring the HS-SCCH less operation in the CPC, so as to enhance the efficiency of radio resource control in the wireless communications system. Please refer to FIG. 3, which illustrates a schematic diagram of a process 30 according to an embodiment of the present invention. The process 30 is utilized for a user equipment improving configurations of an HS-SCCH less operation in CPC of a wireless communications system, and can be compiled into the HS-SCCH less operation configuration program code 220. The process 30 includes the following steps:

Step 300: Start.

Step 302: Configure a first HS-PDSCH code of the user equipment according to a variable "HS-PDSCH Code Index" of an IE "HS-SCCH Less Information" before the user equipment activates an HS-SCCH less operation.

Step 304: Configure a second HS-PDSCH code of the user equipment according to an Boolean variable of the IE "HS-SCCH Less Information", among which the Boolean variable is indicated by one bit and the second HS-PDSCH code is an adjacent channel code of the first HS-PDSCH code.

Step 306: End.

According to the process 30, before the communications device 100 activates the HS-SCCH less operation, the embodiment of the present invention can configure the first HS-PDSCH code according to the variable "HS-PDSCH Code Index" of the IE "HS-SCCH Less Information" received by the communications device 100, and can configure the second HS-PDSCH code according to an Boolean variable of the IE "HS-SCCH Less Information" which is indicated by 1 bit. Moreover, the Boolean variable is further utilized for indicating the communications device 100 whether the second HS-PDSCH code is used for supporting reception of a corresponding transport block (TB) size with the first HS-PDSCH code. Preferably, the second HS-PDSCH code is an adjacent channel code of the first HS-PDSCH code, such as a next channel code, etc.

In addition, the IE" "HS-SCCH Less Information" further includes a variable "Transport Block Size List" and a variable "Transport Block Size Index". The variable "Transport Block Size List" is utilized for informing the communications device 100 of an TB size list including indexes of TB sizes possibly transmitted by the network, and the variable "Transport Block Size Index" is utilized for indicating the TB sizes corresponding to each TB size index listed in the variable "Transport Block Size List".

Therefore, by the Boolean variable, the embodiment of the present invention can configure the second HS-PDSCH code of the communications device 100 for simultaneously using the first HS-PDSCH code and the second HS-PDSCH code to perform TB reception for a corresponding TB size. Compared with the prior art that needs an extra variable for configuring the second HS-PDSCH code (i.e. a variable "HS-PDSCH Code Index" indicated by 4 bits), the embodiment of the present invention can save the number of bits that need to be transmitted by the network, so that the efficiency of radio resource control in the wireless communications system can be enhanced.

For example, when the Boolean variable is true, indicating that the communications device 100 needs to use the first HS-PDSCH code and the second HS-PDSCH code simultaneously to perform transport block reception for a corresponding transport block size, the embodiment of the present invention then configures a next channel code of the first HS-PDSCH code to be the second HS-PDSCH for the communications device 100. Conversely, when the Boolean variable is false, indicating that the communications device 100 only needs the first HS-PDSCH code for the transport block reception, there is no need to configure the second HS-PDSCH code for the communications device 100.

In other words, since the Boolean variable can be used as the variable "HS_PDSCH Second Code Support" and the second HS_PDSCH code is the next channel code of the first HS_PDSCH code, the embodiment of the present invention only needs 1 bit to perform corresponding configurations for the second HS_PDSCH code. Compared with the prior art that consuming 4 bits for transmitting the variable "HS-PDSCH Second Code Index", the embodiment of the present invention can save the number of bits that need to be transmitted by the network, so that efficiency of radio resource control in the wireless communications system can be enhanced.

Please note that, the embodiment of the present invention can also applied in a long term evolution (LTE) system introduced by the 3rd Generation Partnership Project (3GPP) for configuring decoding resources of a control channel less operation mode. In this case, the channel codes in FIG. 3 can be appropriately modified to be resource blocks, in which related operations are similar to that mentioned above, and thus not narrated herein again. Thus, when activating the control channel less operation mode in the LTE system, the UE can utilize a Boolean variable to configure a second resource block for supporting a first resource block receiving data from a data channel, so as to enhance the efficiency of radio resource control. Such corresponding variation also belongs to the scope of the present invention.

As mentioned above, the embodiment of the present invention provides a method and related communications device for the user equipment for improving configurations of the HS-SCCH less operation of CPC in the wireless communications system, so that the efficiency of system radio resource control can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing continuous packet connectivity for a user equipment in a wireless communications system, the method comprising:

configuring a first high speed physical downlink shared channel (HS-PDSCH) code of the user equipment according to a variable "HS-PDSCH Code Index" of an information element "high speed shared control channel (HS-SCCH) Less Information" before the user equipment activates an HS-SCCH less operation;

configuring a second HS-PDSCH code of the user equipment according to an Boolean variable of the information element "HS-SCCH Less Information", among which the Boolean variable is indicated by one bit;

wherein the Boolean variable further indicates whether the second HS-PDSCH code is used for a Transport Block (TB) size;

wherein the variable "HS-PDSCH Code Index" is indicated by 4 bits; and wherein the second HS-PDSCH code is an adjacent channel code of the first HS-PDSCH code.

2. The method of claim 1, wherein the second HS-PDSCH code is a next channel code of the first HS-PDSCH code.

3. The method of claim 1 further comprising:
utilizing the first HS-PDSCH code and the second HS-PDSCH code simultaneously for receiving transport blocks with a corresponding transport block size when the Boolean variable is true.

4. The method of claim 1 further comprising: utilizing only the first HS-PDSCH code for receiving transport blocks with a corresponding transport block size when the Boolean variable is false.

5. A communications device for enhancing continuous packet connectivity in a wireless communications system, the communications device comprising:
a control circuit for realizing functions of the communications device;
a central processing unit installed in the control circuit for executing a program code to operate the control circuit; and
a memory coupled to the central processing unit for storing the program code; wherein the program code comprises:
configuring a first high speed physical downlink shared channel (HS-PDSCH) code of the user equipment according to a variable "HS-PDSCH Code Index" of an information element "high speed shared control channel (HS-SCCH) Less Information" before the user equipment activates an HS-SCCH less operation;
configuring a second HS-PDSCH code of the communications device according to an Boolean variable of the information element "HS-SCCH Less Information", among which the Boolean variable is indicated by one bit;
wherein the Boolean variable further indicates whether the second HS-PDSCH code is used for a Transport Block (TB) size;
wherein the variable "HS-PDSCH Code Index" is indicated by 4 bits; and
wherein the second HS-PDSCH code is an adjacent channel code of the first HS-PDSCH code.

6. The communications device of claim 5, wherein the second HS-PDSCH code is a next channel code of the first HS-PDSCH code.

7. The communications device of claim 5, wherein the program code further comprises: utilizing the first HS-PDSCH code and the second HS-PDSCH code simultaneously for receiving transport blocks with a corresponding transport block size when the Boolean variable is true.

8. The communications device of claim 5, wherein the program code further comprises: utilizing only the first HS-PDSCH code for receiving transport blocks with a corresponding transport block size when the Boolean variable is false.

* * * * *